J. P. ROSS.
Grain Drill.
No 7,877.    Patented Jan. 1, 1851.
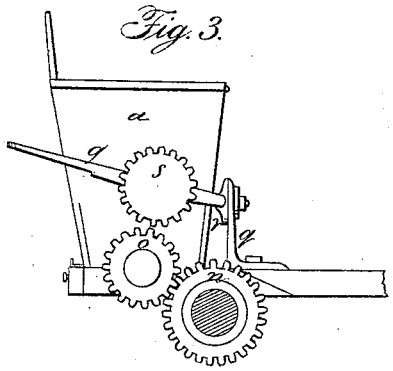
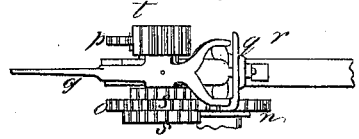
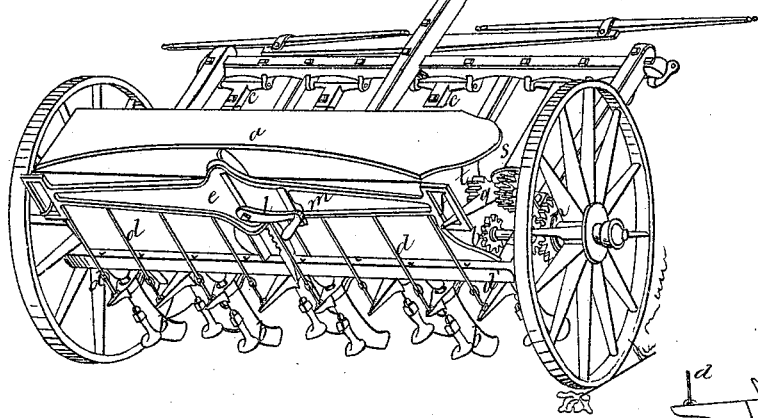
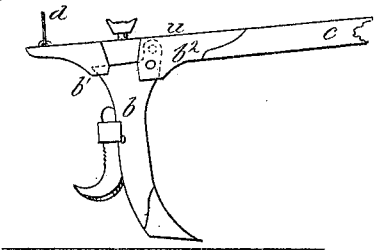
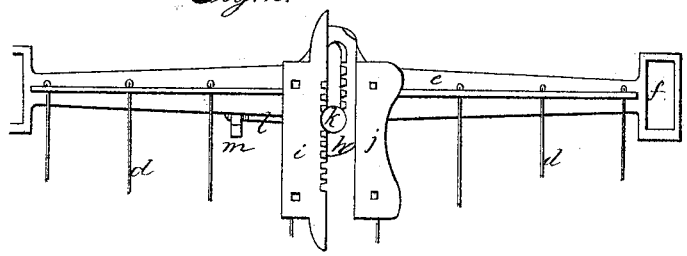

UNITED STATES PATENT OFFICE.

JAMES P. ROSS, OF LEWISBURG, PENNSYLVANIA.

IMPROVEMENT IN SEED-PLANTERS.

Specification forming part of Letters Patent No. 7,877, dated January 1, 1851.

*To all whom it may concern:*

Be it known that I, JAMES P. ROSS, of Lewisburg, in the county of Union and State of Pennsylvania, have invented certain Improvements in Seed-Drills; and I do hereby declare that the following is a full, clear, and exact description of the principle or character which distinguishes them from all other things before known, and of the usual manner of making, modifying, and using the same, reference being had to the accompanying drawings, of which—

Figure 1 is a perspective view of the seed-drill; Fig. 2, a back view of the yoke and racks; Fig. 3, a side elevation of feed-gear; Fig. 4, a plan of same; Fig. 5, the upright standard and fulcrum; and Fig. 6 showing the mode of attaching the teeth.

My improvements consist, first, in the device by which the drill-teeth are raised or lowered at the same time the feed-gear is thrown in or out of gear; secondly, in the mode of constructing the feed-gear so that it can be readily changed to sow different quantities of seed to the acre; and, thirdly, in the manner of attaching the hollow drill-teeth to their drag-bars, so that when coming in contact with any unyielding obstruction they become wholly detached from the machine.

In the drawings, $a$ is the seed-box supported on the frame of the carriage, which runs on two wheels.

The drill-teeth $b$ are connected by their drag-bars $c$ to the front bar of the frame by hinge-joints, which allow the teeth to move up and down, but compel them to follow in a straight line. The drag-bars are suspended at their after ends by rods $d$ from the elevating-yoke $e$, which extends the length of the seed-box, and has a loop or slot, $f$, at one end to receive the tail of the lever $g$, which puts the feed in or out of gear.

In the center of the yoke $e$ is a vertical slot, on one side of which, on the back, is a rack, $h$, parallel with the opening.

On the back of the seed-box $a$ is another rack, $i$, with its teeth facing those of the rack on the yoke. A piece, $j$, is also fixed on the back of the seed-box, which serves to guide the yoke $e$ in a vertical direction and to keep the racks from spreading apart.

A small pinion, $k$, works between the two racks behind the yoke, and to its journal, which projects through the slot, a crank-handle, $l$, is fixed, by which the pinion is turned.

The pinion $k$ has a flange which projects behind the teeth of the stationary rack $i$, and by it the elevating-yoke $e$ is kept in place. By turning the pinion $k$ it rolls up the stationary rack, and its opposite teeth working in the rack $h$ raises the yoke $e$ double the distance that it raises itself.

When up, the handle $l$ is held by a spring-catch, $m$, which prevents it from turning back until released.

The teeth being connected with the yoke $e$ by the rods $d$ are lifted together, and any one or more may be retained in an elevated position by hooking the rings $d'$ onto pins in the back of the frame. The rods $d$ pass through holes in the yoke $e$, and are prevented from dropping through by enlarged heads, and thus one or more teeth may be raised and retained up without affecting the action of the rest.

The feed-gear is constructed as follows: A spur-wheel, $n$, is fixed on the hub of one of the carriage-wheels. This meshes in with another wheel, $o$, running on a pin fixed to the frame in a line with another spur-wheel, $p$, fixed onto the end of the shaft of the feed-rollers.

An upright standard, $q$, is fixed to the frame, having a large slot in its upper end, through which the bolt of an adjustable fulcrum, $r$, passes, and is secured in any position by a nut and washer at the back. The fulcrum supports the end of the lever $g$, the other end of which passes through the loop $f$ on the end of the yoke $e$. The middle of the lever $g$ forms a bearing for the journal of the shaft to which the pinions $s$ and $t$ are fixed. On one end of this shaft are three or more pinions, $s$, of different numbers of teeth, and on the other end is the pinion $t$, so that when the lever $g$ is depressed the feed-rollers are made to revolve by the wheels of the carriage.

The rate of feeding by the apparatus as shown in the drawings is capable of six changes. Three of them can be made by so adjusting the fulcrum $r$ as to bring either of the pinions $s$ to mesh in with the wheel $o$, while the pinion $t$ meshes in with the wheel $p$. The three other changes are made by turning over the lever $g$, and with it the pinions, so as to bring either one of the pinions $s$ to mesh with the wheel $p$ while the pinion $t$ gears with the wheel $o$. The large slot in the standard $q$ allows the fulcrum to be adjusted and fixed by the nut at the back in any of the six positions required to give the several rates of feed, which positions are indicated by numbers stamped on the face of the upright standard in two rows, the lower row corresponding with a notch in the flat part of the fulcrum when the pinions $s$ are on the outer side, and the upper row corresponding with a point projecting from the fulcrum when reversed and the pinion $t$ is brought to the outside. By this arrangement the operator can change the rate of seeding by simply slacking the nut which holds the fulcrum and placing the notch or point to correspond with the number indicating the rate desired.

The proportions of the pinions are such that when the pinions $s$ differ from each other, as 12 14 16, the pinion $t$ has eleven teeth, which gives a regular gradation of changes when reversed.

The tail of the lever $g$ runs through the loop $f$ on the end of the yoke $e$, and thus the feed is thrown in or out of gear simultaneously with the depression or elevation of the teeth.

The drill-teeth $b$ are connected with the drag-bars $c$ in such a manner that when coming in contact with any unyielding obstruction they become wholly detached, and thus prevent straining or breaking the machine.

A casting, $u$, forms the after end of the drag-bar, and has a dovetailed recess into which a corresponding projection, $b'$, on the back of the tooth fits, and also a mortise, which receives a tenon, $b^2$, on the front of the tooth. The tooth is held in position by a wooden pin through the mortise and tenon, which breaks when the tooth is overstrained and allows the tooth to drop out. The tooth, in the act of falling out, turns on the angular projection $b'$ as a center, which prevents the leather tube which conveys the seed through the tooth from being bent short or jammed, which accident is very liable to happen in machines in which the tooth turns on a hinge in front of it under similar circumstances. By this mode of fastening a part or all of the teeth may be readily removed in order to facilitate the transportation of the machine where the ground is uneven, or when it is desired to sow in rows wider apart.

Having thus fully described my improved seed-drill, what I claim as new therein, and desire to secure by Letters Patent, is—

1. The pinion $k$, working between fixed and movable racks, in combination with the elevating-yoke $e$ and the loop $f$ on its end for the purpose of raising the teeth from the ground and simultaneously throwing the feeding apparatus out of gear, substantially as set forth.

2. The feeding-gear, as described, in combination with the lever $g$ and its adjustable fulcrum permitting the pinions to be reversed, by which double the number of changes can be made as can be done by the same number of pinions on the ordinary arrangement.

J. P. ROSS.

Witnesses:
 EDWARD EVERETT,
 WM. GREENOUGH.